United States Patent
Yamashita

(10) Patent No.: US 10,000,106 B2
(45) Date of Patent: Jun. 19, 2018

(54) HEATING DEVICE FOR VEHICLE

(71) Applicant: MAHLE FILTER SYSTEMS JAPAN CORPORATION, Tokyo (JP)

(72) Inventor: Takahisa Yamashita, Tokyo (JP)

(73) Assignee: MAHLE FILTER SYSTEMS JAPAN CORPORATION, Tokyo (JP)

( * ) Notice: Subject to any disclaimer, the term of this patent is extended or adjusted under 35 U.S.C. 154(b) by 33 days.

(21) Appl. No.: 14/914,924

(22) PCT Filed: Aug. 21, 2014

(86) PCT No.: PCT/JP2014/071838
§ 371 (c)(1),
(2) Date: Feb. 26, 2016

(87) PCT Pub. No.: WO2015/029862
PCT Pub. Date: Mar. 5, 2015

(65) Prior Publication Data
US 2016/0200173 A1    Jul. 14, 2016

(30) Foreign Application Priority Data

Aug. 28, 2013    (JP) .................................. 2013-176211

(51) Int. Cl.
*B60L 1/02*    (2006.01)
*B60H 1/22*    (2006.01)
(Continued)

(52) U.S. Cl.
CPC ......... *B60H 1/2225* (2013.01); *F24H 3/0429* (2013.01); *F24H 9/1863* (2013.01);
(Continued)

(58) Field of Classification Search
CPC ...... F24H 3/0429; F24H 3/065; F24H 9/1863; H05B 3/145; H05B 3/16; H05B 2203/023; H05B 2203/034; B60H 2001/229
See application file for complete search history.

(56) References Cited

U.S. PATENT DOCUMENTS

2006/0249499 A1    11/2006    Winkler
2008/0223841 A1*    9/2008    Lofy .................. H05B 3/16
                                                                    219/202
(Continued)

FOREIGN PATENT DOCUMENTS

DE    10 2011 119 289 A1    5/2013
EP    1719649 A2    11/2006
(Continued)

OTHER PUBLICATIONS

Extended European Search Report, dated Mar. 22, 2017, 7 pages.

*Primary Examiner* — Shawntina Fuqua
(74) *Attorney, Agent, or Firm* — Foley & Lardner LLP

(57) ABSTRACT

An electric heater (7) is individually arranged at a position immediately upstream of a blowing port (6) that blows an air fed by a blower (4) into a vehicle room. The electric heater (7) is formed of a cylindrical case (15) loaded in the blowing port (6) and a heat generating sheet (16) arranged in the case (15). The heat generating sheet (16) is formed of a conductive fiber sheet obtained by making a carbon fiber into paper. Furthermore, the heat generating sheet is formed into a continuous strip and radially folded along pins (22) of the case (15). The air is heated while flowing along a surface of the heat generating sheet (16).

7 Claims, 3 Drawing Sheets

(51) Int. Cl.
*H05B 3/14* (2006.01)
*H05B 3/16* (2006.01)
*F24H 3/04* (2006.01)
*F24H 9/18* (2006.01)
*F24H 3/06* (2006.01)

(52) U.S. Cl.
CPC ............... *H05B 3/145* (2013.01); *H05B 3/16* (2013.01); *B60H 2001/229* (2013.01); *F24H 3/065* (2013.01); *H05B 2203/023* (2013.01); *H05B 2203/034* (2013.01)

(56) References Cited

U.S. PATENT DOCUMENTS

| | | | |
|---|---|---|---|
| 2009/0028534 A1* | 1/2009 | Hartmann | ............ B60H 1/2225 392/485 |
| 2012/0155840 A1 | 6/2012 | Hwang | |
| 2012/0261399 A1 | 10/2012 | Lofy | |

FOREIGN PATENT DOCUMENTS

| | | | |
|---|---|---|---|
| JP | 61-45225 U | 3/1986 | |
| JP | 06-018011 U | 1/1994 | |
| JP | 09-286231 A | 11/1997 | |
| JP | 9-286231 A | 11/1997 | |
| JP | 2001-284026 A | 10/2001 | |
| JP | 2002-316561 A | 10/2002 | |
| JP | 2005-147502 A | 6/2005 | |
| JP | 2006-035939 A | 2/2006 | |
| JP | 2007-115610 A | 5/2007 | |
| JP | 2010-003487 A | 1/2010 | |
| JP | 2012-132646 A | 7/2012 | |

* cited by examiner

HEATING DEVICE FOR VEHICLE

TECHNICAL FIELD

The present invention relates to improvements of a heating device for vehicle, wherein an electric heater is arranged at each individual blowing port of the heating device.

BACKGROUND ART

As a heating device of automobile whose power source is an internal combustion engine, a structure, in which air forcibly fed by a blower is heated by a heater core whose source of heat is cooling water (warm water) of the internal combustion engine and in which the air is blown from blowing ports provided toward a vehicle room, is common.

However, as shown in Patent Publication 1 and Patent Publication 2, a heating device for vehicle using an electric heater as a source of heat has come to attract attention with decrease in cooling loss of internal combustion engines and the appearance of hybrid vehicles and electric cars in recent years. In the device described in Patent Publication 1, a PTC heater is arranged within a foot duct to lead a warm air underfoot. Moreover, in the device described in Patent Publication 2, a PCT heater is arranged in a passage in an instrument panel to lead a warm air to driver's knees.

In the heating device for vehicle using an electric heater, it is important how to efficiently conduct heating with a limited electric power.

In the device described in Patent Publication 1, a PTC heater which laminates a lot of structures each putting a tabular PTC ceramic between fins which are made of metal plates is used. As this is a structure that the PTC ceramic heats the fins and thereby these fins warm up air, electric power is uselessly consumed in heating the fins. Besides, in such a structure, it is difficult to arrange a heater at a position immediately upstream of a blowing port, so heat tends to be taken by a duct or a surrounding structure.

Furthermore, in the device described in Patent Publication 2, as it is a structure that a whole space in an instrument panel is warmed by a PTC heater, heat is consumed by the temperature increase of the instrument panel and the surrounding structure. Therefore, only airflow can't be efficiently heated.

PRIOR ART PUBLICATIONS

Patent Publications

Patent Publication 1: Japanese Utility Model Application Publication Heisei 6-18011.
Patent Publication 2: Japanese Patent Application Publication 2002-316561.

SUMMARY OF THE INVENTION

This invention is a heating device for vehicle, in which an electric heater is individually arranged at a blowing port that blows an air fed by a blower into a vehicle room. The above electric heater has a structure wherein a heat generating sheet, which generates heat by supplying electricity thereto and is formed in a strip shape, is received in a case such that the heat generating sheet is folded twice or more and that a surface of the heat generating sheet is made to be along a direction of a flow at the blowing port.

In such a structure, the air fed by the blower is heated during flowing along the surface of the heat generating sheet immediately before being blown from the blowing port. The heat generating sheet arranged in the case by being folded twice or more heats in itself, thereby directly heating the air which the surface is touching. Therefore, warm air having an equal temperature distribution is efficiently generated without unnecessarily heating a surrounding structure, etc.

In one preferable mode of the present invention, the above case is equipped with plural pins situated inside folded parts of the above heat generating sheet, wherein the above heat generating sheet is folded along these pins.

For example, in the above case, there are plural pins arranged at an outer periphery and plural pins arranged at an inner periphery, and the above heat generating sheet is radially folded along these pins.

In such a structure in which a belt-like heat generating sheet is folded along pins located in a case, the heat generating sheet having flexibility can be certainly arranged to have a predetermined layout. Furthermore, as the folded neighboring heat generating sheets are certainly separated by the pins, a short circuit is prevented among them.

In one preferable mode of the present invention, the above heat generating sheet is formed of a conductive fiber sheet obtained by making a conductive fiber into paper. Such a heat generating sheet has conductivity and generates heat by turning on electricity. In such a structure using a conductive fiber sheet, an excessive inrush current like a PTC heater doesn't arise at the start of turning on electricity. Therefore, it is possible to simultaneously generate a warm air at plural blowing ports with a limited electric power of a vehicle.

According to this invention, airflow provided from a blowing port to a vehicle room can be efficiently heated with a limited electric power, and it can be used as a heating device supplementally added to a hot-water heating device, or a main heating device of an electric vehicle, etc.

EMBODIMENTS FOR CARRYING OUT THE INVENTION

Hereinafter, an embodiment of this invention is explained in detail on the basis of the drawings.

Figure 1:
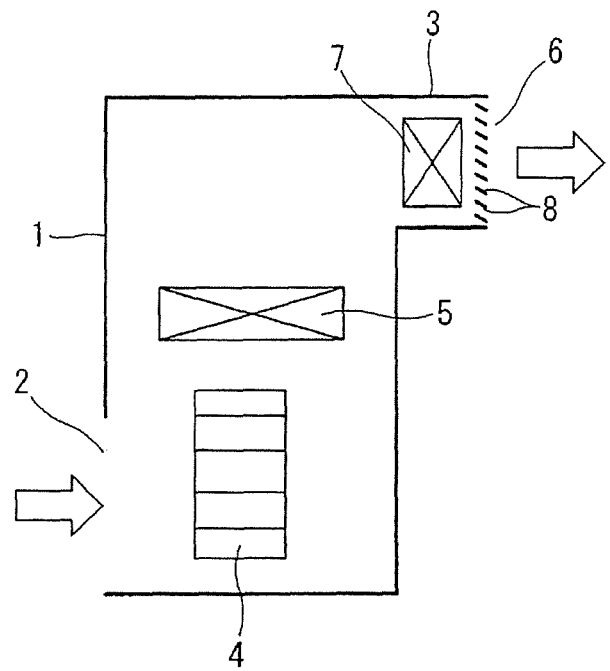
FIG. 1 is a structural explanatory view which shows an embodiment of a heating device according to this invention.
Figure 2:
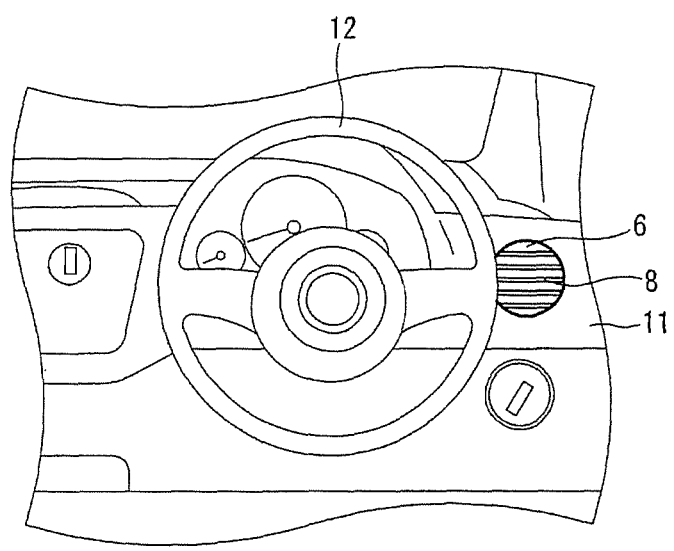
FIG. 2 is a perspective view of a main section of an instrument panel equipped with an electric heater at a side blowing port.

FIG. 1 is a structural explanatory view of an embodiment in which this invention has been applied to a heating device of an automobile using an internal combustion engine as a power source. This heating device is equipped with an electric blower 4 which sends an air taken in the device from an air intake 2 of a housing 1 to a duct 3 which is a part of the housing 1, a heater core 5 arranged in the downstream side of the blower 4, and an electric heater 7 set up at a position immediately upstream of a blowing port 6 located at an end of the duct 3. The above heater core 5 is for exchanging heat between a cooling water of the internal combustion engine and air. An airflow which has been sent by the blower 4 and then passed through the heater core 5 is distributed to plural blowing ports 6. The blowing port 6 shown in the drawing represents one of the plural blowing ports 6 located toward a vehicle room. For example, as shown in FIG. 2, it is a circular blowing port 6 placed on a side (side of steering wheel 12) of an instrument panel 11 in front of the driver's seat. In the blowing port 6, a louver 8 to adjust a blowing direction is arranged, and a cylindrical electric heater 7 is adjacently arranged in the back of this louver 8.

Furthermore, FIG. 1 is a figure in which only components necessary for a heating device are schematically shown. In an upper stream of an air intake 2, an inside-outside air changeover door to switch the outside air and the inside air circulation is set up. In a downstream side of the heater core 5, a blowing port changeover door to switch air induction toward the plural ducts 3 is set up. However, these have not been shown in FIG. 1. Moreover, actually, in many cases, as an air conditioning device having not only a heating function but also a cooling function, what is called a reheat air-mix type air conditioning device, which contains an evaporator and an air-mix door as described in Patent Publication 1, is formed. The present invention can be similarly applied as such an air conditioning device.

Figure 3:
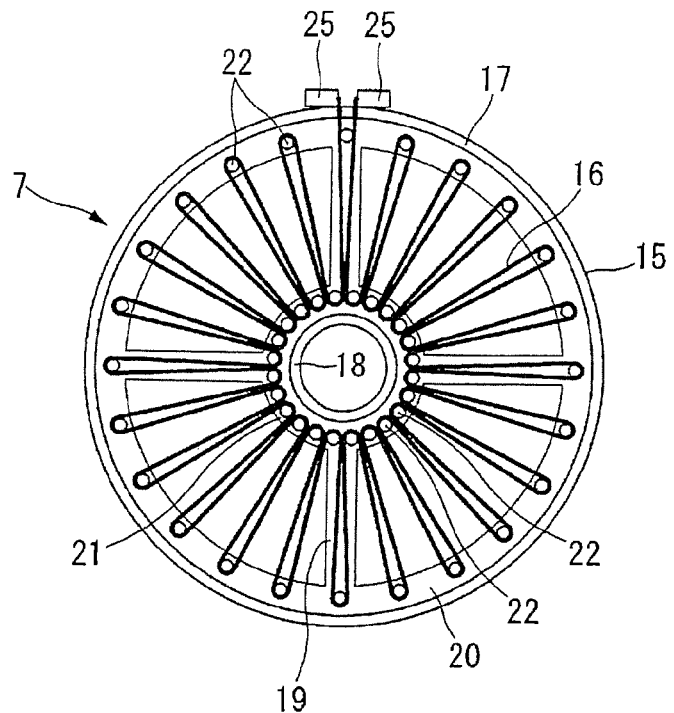
FIG. 3 is a plan view which shows an electric heater.
Figure 4:
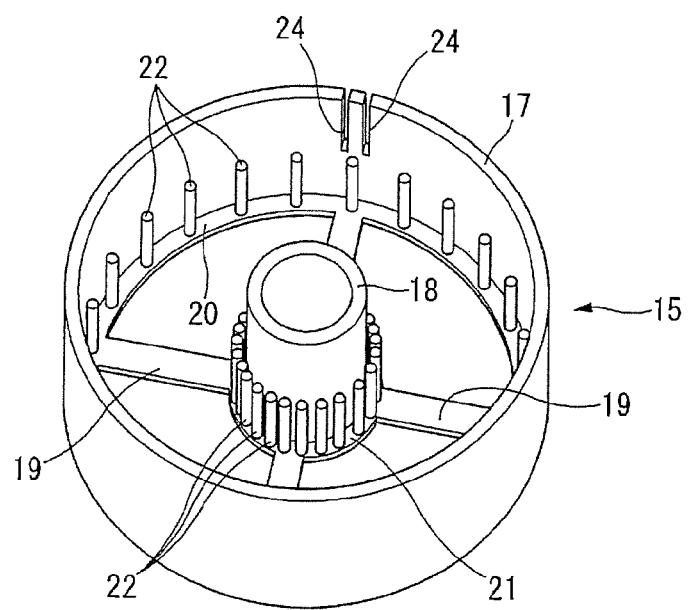
FIG. 4 is a perspective view which shows a case of this electric heater.

FIG. 3 shows an embodiment of a cylindrical electric heater 7 arranged in a blowing port 6. This electric heater 7 is formed of a case 15 making a cylindrical shape which is loaded in the blowing port 6 and a heat generating sheet 16 arranged in this case 15.

The case 15 is, for example, what is integrally molded with a synthetic resin. Therein, an outer cylinder 17 whose shape is cylindrical and a small diameter inner cylinder 18 whose shape is also cylindrical are concentrically arranged. They are connected with each other by a connector bar 19 radially set up so as to be a nearly cross shape in one end of an axial direction. In one end of the above outer cylinder 17, an outer peripheral flange part 20 juts out from the outer cylinder 17 to an inner peripheral side. In one end of the inner cylinder 18, an inner peripheral flange part 21 juts out from the inner cylinder 18 to an outer peripheral side. The above connector bar 19 is set up between the outer peripheral flange part 20 and the inner peripheral flange part 21. Furthermore, in these outer peripheral flange part 20 and inner peripheral flange part 21, plural pins 22, which jut out in a direction parallel to the axial direction of the outer cylinder 17 and the inner cylinder 18, are integrally formed. These pins 22 have a thin columnar shape and are arranged at regular intervals (for example every 15 degrees) in a circumferential direction of the cylindrical case 15. For further details, in case of looking in the circumferential direction, each pin 22 is arranged so that one pin 22 on an inner peripheral side is arranged between adjacent two pins on an outer peripheral side. In a spot in the circumferential direction of the outer cylinder 17, a pair of slits 24, which is positioned at a terminal described below, is set up.

The heat generating sheet 16 to be arranged in the above case 15 is formed of a conductive fiber sheet which is obtained by making a short fiber of a carbon fiber into paper. Furthermore, some other fibers except for a carbon fiber may be included for adjusting resistance value, etc. This conductive fiber sheet has conductivity and a characteristic that heat is generated by turning on electricity. In this embodiment, the conductive fiber sheet is formed into a continuous strip and alternately folded in the opposite direction at intervals which are approximately equivalent to the distance in a radial direction between the outer cylinder 17 and the inner cylinder 18. In a word, it is what is called folding into pleats.

Furthermore, the heat generating sheet 16 is held in annular space between the outer cylinder 17 and the inner cylinder 18 so that the pin 22 is situated inside each folded part. That is to say, the belt-like heat generating sheet 16 is folded so that the pin 22 is situated inside the folded part. Furthermore, the heat generating sheet 16 is arranged so as to be generally radial between the outer cylinder 17 and the inner cylinder 18. Therefore, the surface of the heat generating sheet 16 comes to be along the direction of an airflow.

At both ends of the belt-like heat generating sheet 16, terminals 25 formed of a conductive metal to connect to the outside are respectively set up. Both end parts of the heat generating sheet 16 equipped with the terminals 25 are taken out to the outer peripheral side through slits 24. The terminals 25 are set up on an outer peripheral surface of the outer cylinder 17. Furthermore, it is also possible to make a structure so that an electric connection can be conducted, by only forming a terminal strip, which is brought into contact with the terminals 25, on the side of the blowing port 6 to which this electric heater 7 is attached, and then loading the electric heater 7 into the blowing port 6.

The electric heater 7 formed as above is, for example, energized immediately after cold start, etc. in which heating by warm water is insufficient through a controller not shown in the drawings. Thereby, it is possible to quickly provide a heating for a driver although it is local. For example, in the illustrated example, it is possible to quickly warm hands of a driver operating a steering wheel 12.

An airflow fed by the blower 4 passes through the electric heater 7 immediately before being blown from the blowing port 6, and the air is efficiently heated while flowing in each section within the case 15, which is partitioned into a narrow pathway by the heat generating sheet 16 arranged radially. The heat generating sheet 16 formed of a conductive fiber sheet heats in itself by turning on electricity. Moreover, it is possible to obtain a sufficiently large area of the heat generating sheet 16 as compared with the cross sectional area of the pathway of the case 15, so the airflow can be heated without excessively increasing the temperature of the heat generating sheet 16. Therefore, it is possible to conduct an efficient local heating with a small amount of electric power without transferring heat to a surrounding structure, etc.

Furthermore, in the above heat generating sheet 16 formed of a conductive fiber sheet, as an excessive inrush current like a PTC heater doesn't arise in the initial stage, it is possible to simultaneously use the electric heaters 7 in the blowing ports 6 at different places under a limited battery capacity or power generation capacity.

Furthermore, in the structure of the above embodiment, the belt-like heat generating sheet 16 is folded along the plural pins 22 on an outer peripheral side and an inner peripheral side, which make a part of the synthetic resin-made case 15. Therefore, it is possible to certainly arrange the heat generating sheet 16 having flexibility to have a predetermined layout. Furthermore, as the folded neighboring heat generating sheets are certainly separated from each other by the pins 22, a short circuit can be prevented among them. Moreover, by the existence of the pin 22 at the folded part, air comes to certainly touch the surface of the heat generating sheet 16 in an outer peripheral part and an inner peripheral part which are near to the pins 22. Therefore, it is possible to effectively use the whole surface of the heat generating sheet for heating air.

Moreover, in the electric heater 7 of the above embodiment, it is possible to variably set the heating value and the surface area of the heat generating sheet 16 by modifying the number of folding times (in other words, the total length of the belt-like heat generating sheet 16) of the heat generating sheet 16 and the width (length along the axial direction of the case 15) of the heat generating sheet 16 through the pins 22. For example, it is possible to easily set the electric heaters 7 having various heating capacities to blowing ports 6 having the same diameter.

Figure 5:
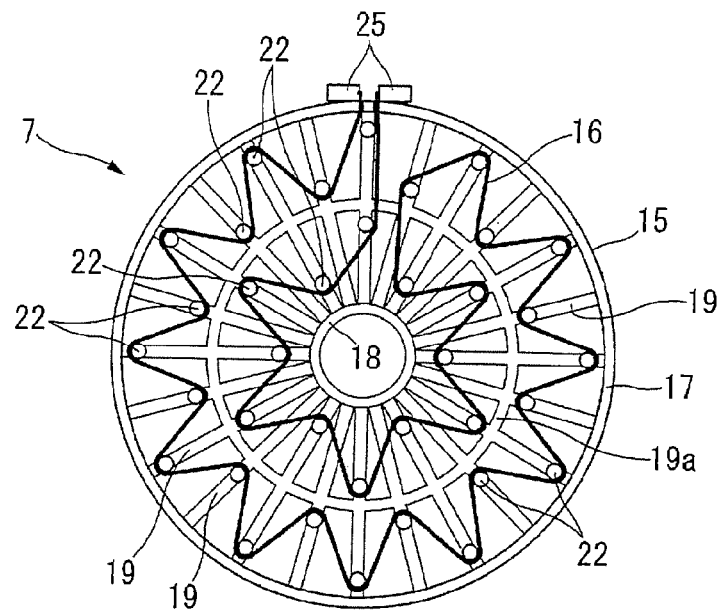
FIG. 5 is a plan view which shows an electric heater of the second embodiment.
Figure 6:
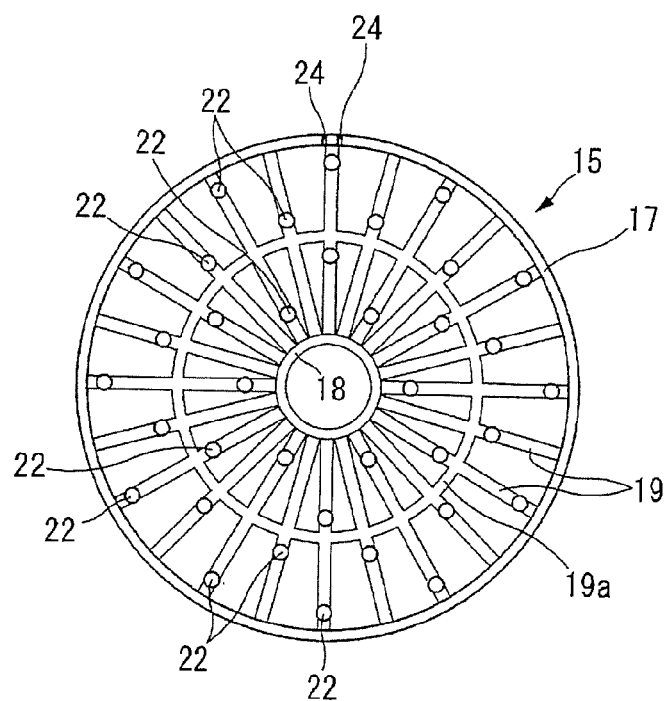
FIG. 6 is a plan view which shows a case of this electric heater.

Next, FIG. 5 and FIG. 6 show a second embodiment of the electric heater 7, in which a layout of the heat generating sheet 16 is modified. In this embodiment, although the synthetic resin-made case 15 has an outer cylinder 17 and an inner cylinder 18 still concentrically arranged, one end of the outer cylinder 17 and one end of the inner cylinder 18 are connected with each other by plural radial connector bars 19. In the illustrated example, relatively narrow connector bars 19 are formed at every 15 degrees, and these connector bars 19 are connected with each other in a circumferential direction by an annular rim 19a. The plural pins 22 to be arranged inside folded parts of the heat generating sheet 16 are supported on these connected bars 19. Especially, the pins 22 are arranged along four concentric circles in this embodiment.

Specifically, the pins 22 arranged along the circle of the outermost periphery are provided on alternate connector bars 19. In middle connector bars 19 put therebetween, the pins 22 located along a circle which is barely larger than the rim 19a are arranged. Furthermore, six pins 22 are arranged along a circle which is barely smaller than the rim 19a. Furthermore, six pins 22 are arranged along a circle having the smallest diameter so as to be located between the two adjacent pins 22 in the circle which is barely smaller than the rim 19a.

Moreover, as shown in FIG. 5, by making use of these pins 22, the heat generating sheet 16 is stellately arranged in the inner peripheral side than the rim 19a while the heat generating sheet 16 is radially or stellately arranged in the outer peripheral side than the rim 19a. In a word, the continuous belt-like heat generating sheet 16 is folded into pleats and arranged doubly on inside and outside.

In this way, in the present invention, how the belt-like heat generating sheet 16 is laid out is optional, and it should be appropriately laid out so as to obtain a requisite surface area in the cross sectional area of the case 15 (that is to say, the cross sectional area of the blowing port 6).

The above is an explanation of an embodiment of the present invention, based on the drawings. However, the present invention is not limited to a cylindrical blowing port such as the above embodiments, and can be applied to blowing ports which have various shapes and are at various positions. Furthermore, it can be similarly applied even in the case of conducting a heating of a vehicle room by only an electric heater, not a supplementary heating device such as the above embodiments.

The invention claimed is:

1. A heating device for vehicle, in which an electric heater is individually arranged at a blowing port from which an air fed by a blower is blown into a vehicle room,
    wherein the electric heater has a structure in which a heat generating sheet, which generates heat by supplying electricity thereto and is formed in a strip shape, is received in a case such that the heat generating sheet is folded twice or more and that a surface of the heat generating sheet is made to be along a direction of a flow at the blowing port,
    wherein the case is equipped with plural pins situated inside folded parts of the heat generating sheet, and the heat generating sheet is folded along the plural pins,
    wherein the heat generating sheet is radially folded along pins arranged at an outer periphery and pins arranged at an inner periphery of the case.

2. The heating device for vehicle as claimed in claim 1, wherein the heat generating sheet is formed of a conductive fiber sheet obtained by making a conductive fiber into paper.

3. The heating device for vehicle as claimed in claim 1, wherein the heating device is equipped with a louver at the blowing port, and the electric heater is adjacently arranged in a back of the louver.

4. The heating device for vehicle as claimed in claim 1, wherein a heater core is arranged in a downstream side of the blower, and the electric heater is set up in each of blowing ports to which an airflow passed through the heater core is distributed.

5. The heating device for vehicle as claimed in claim 1, wherein the case comprises an outer cylinder and an inner cylinder, the outer cylinder and the inner cylinder being concentrically arranged in the case and being connected with each other by a connector bar.

6. The heating device for vehicle as claimed in claim 5, wherein pins are provided on the connector bar.

7. A heating device for vehicle, in which an electric heater is individually arranged at a blowing port from which an air fed by a blower is blown into a vehicle room,
    wherein the electric heater has a structure in which a heat generating sheet, which generates heat by supplying electricity thereto and is formed in a strip shape, is received in a case such that the heat generating sheet is folded twice or more and that a surface of the heat generating sheet is made to be along a direction of a flow at the blowing port,
    wherein the case is equipped with plural pins situated inside folded parts of the heat generating sheet, and the heat generating sheet is folded along the plural pins.

* * * * *